United States Patent Office 3,358,361

Patented Dec. 19, 1967

3,358,361

SUPERCONDUCTING WIRE

Carl L. Kolbe, Schenectady, N.Y., assignor to General Electric Company, a corporation of New York No Drawing. Filed Jan. 4, 1965, Ser. No. 423,307

5 Claims. (Cl. 29—599)

This invention relates to superconductors and more particularly to an improved process for producing solid core superconductive wire having improved current carrying characteristics.

While the existence of superconductivity in particular metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous and to advances in cryogenics which removed many of the economic and scientific problems formerly involved in extremely low temperature operations.

As is well known, "superconduction" is a term describing the type of electrical current conduction existing in certain materials cooled below a critical temperature, $T_c$, where resistance to the flow of current is essentially nonexistent. A superconductive material, that is, any material having a critical temperature, $T_c$, below which normal resistance to the flow of electrical current is absent, can be subjected to an applied magnetic field when cooled below $T_c$ and a current will be induced therein. The current in the superconductive material, however, even with the removal of the applied magnetic field, will theoretically continue for an infinite time and is therefore called "supercurrent" to distinguish it from the usual current present at temperatures above the critical temperature, $T_c$, but supercurrents will exist in those materials classified as "soft" superconductors only if a geometry is provided which has multiply-connected surfaces, as opposed to a simply-connected surface, and the applied magnetic field is below a critical magnetic field, $H_c$. A solid cylinder is an example of a simply-connected body, and a cylinder having an axial bore or a hollow sphere are examples of multiply-connected bodies. In the case of "hard" superconductors, supercurrents will exist without regard to the geometry of the body, since they are inherently multiply-connected. Here, assuming the low temperature requirement which is present in all cases, the applied magnetic field need only be below the critical field, $H_c$.

The terms "hard" and "soft," as applied to superconductors, originally referred principally to these physical properties of the materials. Subsequently, however, the terms have ordinarily been used when referring to the magnetic properties, although there is often a correlation between the physical and magnetic hardness and softness. As a general matter, it may now be assumed that a hard superconductive body is one wherein, either by virtue of composition or geometry, or both, the application of a sub-critical magnetic field to it at temperature below $T_c$ will result in magnetic flux being "trapped," that is, remaining even after the applied magnetic field has been removed. This so-called trapped flux actually derives from sustaining supercurrents created in the superconductive body by the applied magnetic field. Thus, a hard superconductive body is one in which irreversible magnetic effects are present. Stated slightly differently, a hard superconductive body will evidence magnetic hysteresis when subjected to a cyclically-reversed applied magnetic field.

Soft magnetically superconductive bodies are, by way of comparison, composed of materials which are not inherently magnetically hard and which haev only a simply-connected surface. If a soft superconductive material is shaped in solid cylindrical form, the superconductive body is soft. If, on the other hand, the same soft material is shaped into hollow cylindrical form, the resulting superconductive body may be classified as hard, since it will trap flux.

It is a principal object of this invention to provide an improved process for producing superconductive wires having increased current carrying capacities.

It is an additional object of this invention to provide a process for producing superconducting wires having pure tin as an inner core material, which wire has improved current carrying capacities.

It is another object of this invention to provide an improved superconducting wire.

Other objects and advantages of this invention will be in part obvious and in part explained by reference to the accompanying specification.

Basically, the process of this invention comprises providing a solid metal body composed of a first metal and then inserting the solid metal body into a hollow body composed of a second metal which is capable of reacting with the solid metal body to form a superconductive alloy, and then heating assembly of the first and second metal bodies until the two have reacted and formed a superconductive alloy. The article of the invention is the superconductive body produced by means of the aforementioned process. Generally, the invention is most directly concerned with the production of superconducting wires of greater length than diameter so that the hollow second body is an elongated hollow tube into which the first metal body, which is in the form of a wire, is inserted.

It has been found that superconductive wire having a high current carrying capacity (e.g., $3.19 \times 10^5$ amp/cm.$^2$ at 50 kg.) can be produced by using tin as a core material within an outer tube or jacket which will react with the tin to form a superconductive compound. For example, an outer tube or jacket of niobium would react with a tin core to form a superconductive compound $Nb_3Sn$. There are several advantages in using pure tin as a core material. First, the core material is cheap and easy to prepare and it can be cast, extruded, swaged, drawn or pressed from powder to the size of the tube within which it is enclosed. Additionally, greater control of purity and reduction of oxide contamination is possible. Further, other elements may be easily added to the tin for alloying purposes to further improve the current carrying capacities of resulting composite. For example, additions of Cd, Bi, Sb, In, Tl, Pb, Zn, Al, Ag, and Zr are all effective for changing the current carrying performance of the wire. The problem of insulating the wire is less severe since the relatively low melting point tin is contained within a higher melting point material. Additional advantages are obtained by the decreased tendency for the contamination of the wire to occur and by enabling better control of the tin concentration through control of the diameter of the core. Multiple sranded wires can be used and additionally the wire can be shaped into some preselected form, such as a ribbon-like shape, to give a better packing fraction in addition to lowering the level of stress concentrations.

Aluminum can replace tin as a core material and vanadium can be used as a jacketing material and used in combination with gallium or silicon. Other combinations well known to those skilled in the art will readily suggest themselves.

As an example, a tin cored niobium wire was produced by placing a swaged and drawn .145 inch tin rod into a niobium tube with a .250 inch outside diameter. The niobium tube was placed into a copper tube with a .250 inch inside diameter and a .375 inch outside diameter. This compact or composite structure was then drawn through a series of dies to .005 inch outside diameter and the copper removed with nitric acid to produce wire .0035 inch outside diameter. The outside diameter of a typical outer shell of niobium ranged from .010 inch to .0105 inch. The tube and core may have intermediate heat treatment while drawing to maintain greater tube and wire ductility prior to final heat treatment as a coil. Small coils constructed with this tin cored niobium have produced fields as high as 17,200 oersteds and carried as much as 37 amperes. A small coil placed inside a 50 kg. magnetic field carried 76 amperes in a field of 55,850 gauss for a current density of 1.45 amperes per square centimeter at 50,000 gauss.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. In the process for producing superconductive wire the steps comprising, providing a rod-like solid metal body composed of a first metal, inserting the rod-like body into a hollow tube composed of a second metal capable of reacting with the first metal to form a superconductive metal, enclosing the rod-like body and the hollow tube in a jacket of a third metal which is substantially non-reactive with respect thereto and physically drawing the bodies from the original to a smaller diameter, removing the jacket of the third metal, and heating the drawn assembly of the first and second metal bodies to a temperature sufficient to cause reaction therebetween with formation of a superconductive alloy.

2. A process as defined in claim 1 wherein the first metal is tin and the second metal is niobium.

3. A process as defined in claim 1 wherein the first metal is aluminum and the second metal is niobium.

4. A process as defined in claim 1 wherein the first metal is gallium and the second metal is vanadium.

5. In the process for producing superconductive wire the steps comprising, providing a rod-like solid body composed of silicon, inserting the rod-like body into a hollow tube composed of vanadium, enclosing the rod-like body and the hollow tube in a jacket of a metal which is substantially non-reactive with respect thereto and physically drawing the bodies from the original to a smaller diameter, removing the jacket of last recited metal, and heating the drawn assembly of silicon and vanadium to a temperature sufficiently high to cause reaction therebetween with formation of a superconductive alloy.

References Cited

UNITED STATES PATENTS

| | | | |
|---|---|---|---|
| 3,048,707 | 8/1962 | Nyberg. | |
| 3,162,943 | 12/1964 | Wong. | |
| 3,218,693 | 11/1965 | Allen | 29—155.5 |
| 1,078,906 | 11/1913 | Eldred | 29—473.5 |
| 1,193,667 | 8/1916 | Corey | 29—474.4 |
| 2,761,207 | 9/1956 | Dodd | 29—474.3 |
| 2,958,836 | 11/1960 | McMahon. | |
| 3,310,862 | 3/1967 | Allen. | |

OTHER REFERENCES

"Physical Review Letters," vol. 6, No. 3, Feb. 1, 1961, pp. 89–91.

WILLIAM I. BROOKS, *Primary Examiner.*